Figure 1:
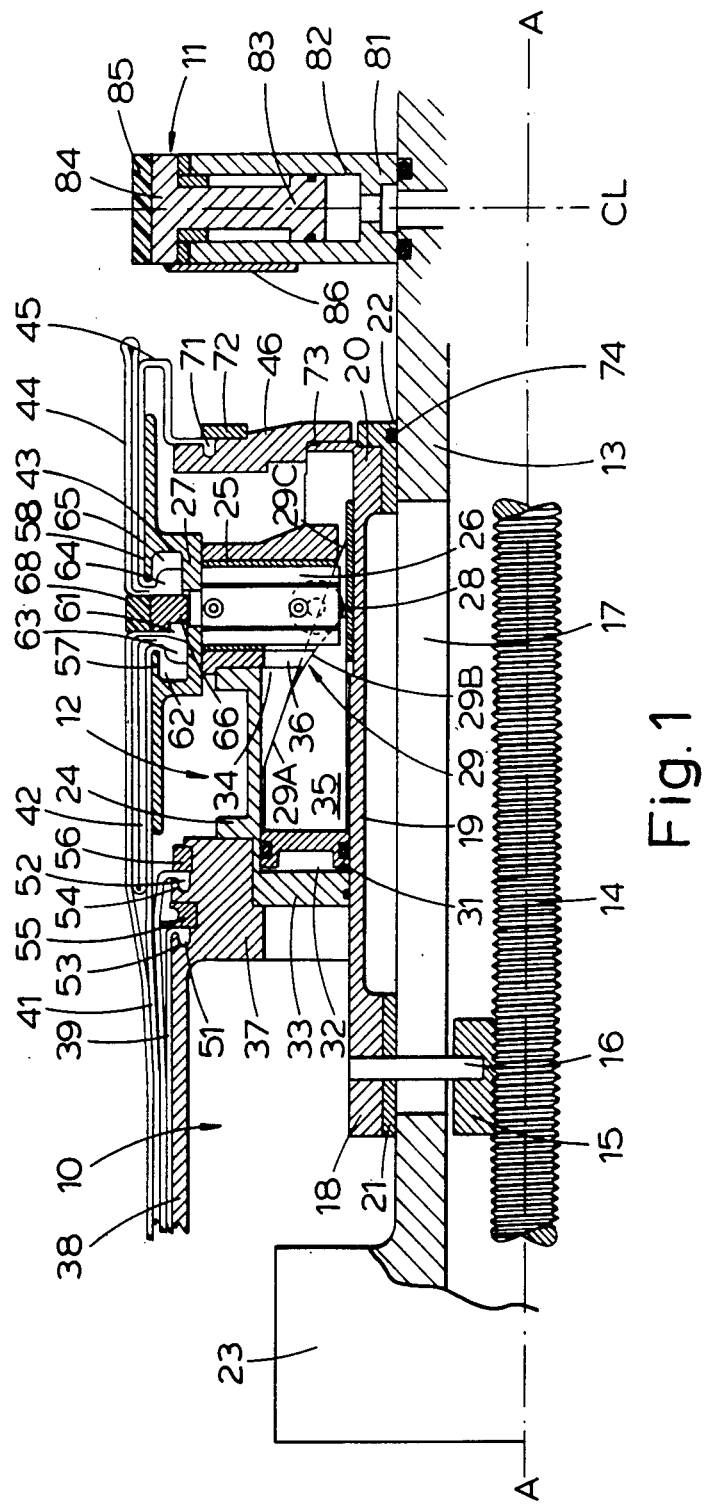

United States Patent [19]

Stalter, deceased et al.

[11] Patent Number: 4,683,021
[45] Date of Patent: Jul. 28, 1987

[54] TIRE BUILDING DRUM

[75] Inventors: Joseph F. Stalter, deceased, late of Mogadore, Ohio, by Bernadette M. Stalter, executrix; Gilbert M. Feller, Ingeldorf, Luxembourg

[73] Assignee: The Goodyear Tire & Rubber Company, Akron, Ohio

[21] Appl. No.: 794,883

[22] Filed: Nov. 4, 1985

[30] Foreign Application Priority Data

Nov. 26, 1984 [EP] European Pat. Off. ........ 84630178.6

[51] Int. Cl.$^4$ ............................................. B29D 30/24
[52] U.S. Cl. .................... 156/415; 156/126; 156/132; 156/133; 156/401; 156/403; 156/406.2; 156/416
[58] Field of Search ................................ 156/414–420, 156/398, 401, 394.1, 403, 406.2, 110.1, 126, 127, 132, 133

[56] References Cited

U.S. PATENT DOCUMENTS

| | | |
|---|---|---|
| 3,418,192 | 12/1968 | Nädler . |
| 3,816,218 | 6/1974 | Felten . |
| 3,833,445 | 9/1974 | Mallory et al. . |
| 4,226,656 | 10/1980 | Appleby et al. . |
| 4,239,579 | 12/1980 | Felten et al. . |
| 4,243,451 | 1/1981 | Kortman . |
| 4,472,233 | 9/1984 | Fukamachi et al. ............ 156/416 X |
| 4,508,586 | 4/1985 | Brown et al. .................... 156/416 X |

FOREIGN PATENT DOCUMENTS

| | | |
|---|---|---|
| 2225851 | 12/1973 | Fed. Rep. of Germany . |
| 2353500 | 7/1974 | Fed. Rep. of Germany . |
| 2453015 | 10/1980 | France . |
| 2067481 | 7/1981 | United Kingdom . |

Primary Examiner—Donald E. Czaja
Assistant Examiner—Thomas Bokan
Attorney, Agent, or Firm—T. P. Lewandowski

[57] ABSTRACT

A tire building drum (10) has a central shaft (13) and a pair of end drum assemblies (12) mounted for axial movement along the shaft. The end drum assemblies (12) include a main sleeve (19) slideable on the shaft (13), and an annular housing (24) mounted on the sleeve to form an annular chamber (32) surrounding the sleeve (19) which houses an annular piston (31). There is an annular expansion means (bead seating segments) (27) mounted on the housing (24) which are moved radially by a ramp means (35) attached to the piston (31). This ramp means (35) have a cam surface (29) thereon comprising an inclined radially outer portion (29a) and a convex arcuate radially inner portion (29b). Further, the end drum assemblies have annular bladders (39), (41), (42), and (44) thereon that each have solid annular lip portions (51, 52) (61, 62), (63), (64) respectively, by which they are secured to the end drum assemblies. Each lip portion is held in a radially undercut groove (53, 54) (43) and is secured therein by a split ring (55) (56) (66) which can be withdrawn radially.

12 Claims, 8 Drawing Figures

TIRE BUILDING DRUM

DESCRIPTION OF THE INVENTION

This invention relates to tire building drums and in particular to drums utilized for the shaping of a preassembled carcass band into a torroidal carcass, and more particularly to the building and shaping of truck tires.

According to the invention there is provided a tire building drum having a center shaft, and a pair of end drum assemblies mounted on the center shaft, each of said end drum assemblies comprises:

a sleeve mounted co-axially on the center shaft and slideable along the shaft, an annular housing mounted on the sleeve and forming a co-axial annular chamber around the sleeve, an annular expansion means mounted co-axially on the annular housing for radial movement relative to the sleeve, an annular piston axially slideable in the co-axial annular chamber to effect a radially outward force and movement on the annular expansion means, ramp means associated with the annular piston and engageable with the annular expansion means to move the annular expansion means radially of the sleeve in response to axial movement of the piston, said ramp means including a cam surface comprising two portions, an inclined radially outer portion, and an arcuated convex radially inner portion.

Also according to the invention there is provided a tire building drum having a center shaft:

a pair of co-axial end drum assemblies each mounted on the center shaft for axial movement toward and away from each other, the end drum assemblies each providing a generally cylindrical surface for supporting a cylindrical tire carcass band; and including a radially expandable bead seating means forming part of the end drum assembly: and annular inflatable bladders which when uninflated form a substantially cylindrical tire building surface around the end drum assemblies, said inflation bladders comprising an inside shoulder bladder located axially inwardly of and adjacent to the bead seating means, an outside shoulder bladder located axially outwardly of and adjacent to the bead seating means, a first turn-up bladder also located adjacent the axially outer side of the bead seating means and completely enveloping the outside shoulder bladder, and a second turn-up bladder located axially outside the first turn-up bladder, and when said bladder are uninflated lying radially inwardly of the first turn-up bladder.

The invention will be described by way of example and with reference to the accompanying drawings in which:

FIG. 1 is a longitudinal cross section through a tire building drum according to this invention. The drum is symmetrical about its longitudinal axis A—A and its axial center line $C_L$, and FIGS. 2-7 are schematic drawings which show the drum at various stages of the tire building process FIG. 8 is an enlarged section from FIG. 1 showing the cam surface of the annular piston for operation of the bead seat segments.

With reference to FIG. 1 there is illustrated a tire building drum 10 comprising a central support drum 11 with an end drum assembly 12 on each axial side thereof. Only one of the end drum assemblies 12 is illustrated it being understood that the two end drum assemblies are identical. The central support drum 11 is mounted in a fixed position on a central hollow shaft 13. The two end drum assemblies 12 are also mounted on the shaft 13, one on each axial side of the central drum 11. The shaft 13 has a flange 23 at one end by which it can be mounted on a tire building machine for rotation about its longitudinal axis. For the purpose of this description the terms 'axial' and 'axially' refer to displacements along the longitudinal axis A—A, and the terms 'radial' and 'radially' refer to displacements normal to the axis A—A. The two end drum assemblies 12 are moveable axially along the shaft symmetrically towards and away from the central drum 11 by a co-axial operating screw 14 located in the hollow center of the shaft 13. The operating screw 14 has oppositely threaded screw portion to effect movement of nuts 15 (only one of which is shown) symmetrically towards and away from the central drum 11.

Each end drum assembly 12 is mounted on a main sleeve 19 having radially inwardly projecting annular ribs 18 and 20 at each axial end portion thereof. The two annular ribs 18 and 20 have slide bushings 21 and 22 respectively on their radially inner surfaces which are a sliding fit with the cylindrical outer surface of the shaft 13. The sleeve 19 is connected by two radial pins 16 (only one of which is shown), located in the annular rib 18 and which pass through longitudinal slots 17 in the shaft 13 to connect with a respective nut 15. The slots 17 accommodate the axial movement of the nuts 15 relative to the shaft 13.

An axially extending annular housing 24 is supported on the main sleeve 19, and has at its axially inner end portion 34 a plurality of, preferably twelve, radially orientated equiangularly spaced slideways 25 each of which provides guidance for the stem 26 of a bead seat segment 27. Each stem 26 has a roller 28 on its radially innermost end.

The annular housing 24 forms a coaxial annular chamber 32 around the main sleeve 19. The chamber 32 has an axially outer end wall 33 and at its axially inner end portion 34 opens into the slideways 25. An annular piston 31 is sealingly slideable in the chamber 32 and has a plurality of axial ramp-like extensions 35 thereon, one per slideway 25, that each extend through radial slots 36 into the slideways 25. The ramp-like extensions 35 each have thereon a cam surface 29 by which the piston 31 engages an annular expansion means, in this case the rollers 28 on the stems 26 of the bead seat segments. The piston 31 moves in the chamber 32 in response to the air pressure which can be introduced into the chamber 32 between the end wall 33 and the piston 31. The means of introducing the air pressure into the chamber 32 is not shown, but could conveniently be an air passageway in the end wall 33 which is connected to a source of air pressure. If the air pressure in chamber 32 is increased to move each piston 31 axially inwards (relative to the drum) the rollers 28 will ride up their respective cam surfaces 29 moving the respective stems 26, and bead seat segments 27 radially outwards. A reduction in air pressure in chamber 32 will cause the reverse movement to take place, by the elastic action of the bladders 41, 42, and 44.

With reference now to FIG. 8, the cam surfaces 29 comprise two portions, an upper inclined straight portion 29A and a lower arcuate convex portion 29B. The upper portion 29A is inclined at an angle α of about 20° with respect to the drum axis A—A and the lower curved portion 29B has a radius so as to reduce the axial length of the cam surface 29 by about thirty to forty % of its total imaginary length if the inclined portion 29A has been continued (see dotted line 29C). The curved portion 29B also provides a rapid initial lift for the respective bead seat segment 27 as the piston 21 begins to operate. The ramp like extension 35 slides on an annular slideway 30 located in the outer surface of the main sleeve 19. The slideway 30 could be made of PTFE (polytetrafluoroethylene) to reduce friction.

The annular housing 24 has a cylindrical support 37 mounted onto its outer surface adjacent the end wall 33. The support 37 has an axially outwardly extending cylindrical support wall 38 thereon, forming a cylindrical support surface. The cylindrical support 37 is secured to the annular housing 24 by any suitable means, for example, bolts and the like.

The bead seat segments 27 are arranged around each end drum assembly 12 in a circular band of twelve segments 27. The circular band of segments 27 is arranged so that when the stems 26 are in their radially innermost positions the bead seat segments 27 form a substantially continuous surface circumferentially around the end drum assembly 12 of substantially the same diameter as the support wall 38. The bead seat segments 27 have an axial width such that they extend from a position adjacent the cylindrical support 37 to a position in alignment with the axially inner end of the main sleeve 19. Each segment 27 is provided with an inverted 'T' shaped circumferential slot and the slots in all the segments 27 in the band are axially aligned to form a continuous circumferential groove 43, having overhanging portions 57, and 58.

The substantially continuous cylindrical surface formed by bead seats segments 27 and the support wall 38 provide a supporting surface for four annular elastomeric inflation bladders, an axially outer bottom turn-up bladder 39, a top turn-up bladder 41 extending axially outwardly of the bead seat segments 27 and when uninflated lying radially outwardly of the bottom turn-up bladder 39, an inside shoulder bladder 44 extending axially inwardly of the bead seat segments 27, and an outside shoulder bladder 42 which is located within the envelope of the top turn-up bladder 41. An annular sealing bladder 45 is also secured between the segments 27 and a radial flange 46 mounted on the axially inner end of the main sleeve 19. The inflation bladders 39, 41, 42 and 44 when uninflated form a substantially cylindrical tire building surface around the end drum assemblies.

The annular inflation bladders 39, 41, 42, 44, and the sealing bladder 45 each have thickened solid annular lip portions for attachment of the bladders to either the bead seat segments 27 or the support 37. The bottom turn-up bladder 39 has two lip portions 51 and 52 which are of a radial cross section adapted to interfit in the radially undercut grooves 53 and 54 in the outer surface of the cylindrical support 37. The lip portions 51 and 52 are held in their respective grooves by split rings 55 and 56, respectively, whose arcuate segments can be withdrawn radially. The lip portion 51 and ring 55 must be secured in position prior to the lip portion 52 and ring 56. If the bladder is to be removed the reverse sequence of events takes place. The top turn-up bladder 41 similarly has two thickened lip portions 61 and 62 and the outside shoulder bladder 42 has a single lip portion 63.

The radial cross sections of the lip portions 61, 62, and 63 are cross sections such that they can nestle together, the lip portion 63 being located axially between the lip portions 61 and 62. The inside shoulder bladder 44 has a single lip portion 64 and the sealing bladder 45 has an outer lip portion 65 and an inner lip portion 71. The lip portions 64 and 65 have cross sections such that they nestle together. The lip portions of the bladder can be reinforced by a coil spring in the form of a ring which extends circumferentially within the lip portions.

The bladders 41 and 42 are arranged so that their respective lip portions 61, 62 and 63, when nestled together fit under the overhanging portion 57 at one axial side of the inverted 'T' groove 43 in the segments, and similarly the bladders 44 and 45 are arranged so that when their respective lip portion 64 and 65 are nestled together they fit under the overhanging portion 58 at the opposite axial side of the inverted 'T' groove 43.

The lip portions on each side of the groove 43 are locked in place by a retaining ring 66. The ring 66 is a metal (steel) ring that exerts a compression load on the two sets of lip portions to jam them under the overhanging portions 57 and 58 at the sides of the grooves 43 thereby locking the lip portions of the bladders in position. The retaining ring 66 comprises twelve separate arcuate portions, one per segment 27, so that the ring 66 can expand as the segments moves radially outwards, the retaining ring 66 is held in place by screws into the bead seat segments 27 and by an external elastomeric ring 68, which form a bead seat for locking against a tire bead ring 102 during the tire building operation.

The radially inner lip portion 71 of the sealing bladder 45 is secured to the radial flange 46 on the main sleeve 19 by a retaining ring 72 which is bolted to the flange. The sealing bladder 45 makes an air tight seal between the bead segments 27 and the flange 46. A seal 73 is located between the flange 46 and the sleeve 19, and a further seal 74 serves to seal between the bush 22 and the shaft 13.

The central support drum 11 comprises a disc 81 fixed to the shaft 13, and having a plurality of radial cylindrical bores 82 equiangularly spaced therein. Each bore 82 has a piston 83 therein which is radially moveable in response to air pressure in the bore 82. Each piston 83 has an arcuate head 84 fitted to its outmost end, the heads 84 of the pistons 83 are circumferentially aligned to form cylindrical surface on which is disposed an elastomeric ring 85. A guide plate 86 is attached to each piston head 84 to help prevent the piston from turning in its respective bore 82.

The pistons 83, arcuate heads 84, and ring 85 provide a radially expandable cylindrical surface for supporting the internal surface of a carcass band which is placed onto the tire building drum 10.

Air pressure for the inflation of the bladders 39, 41, 42, 44 and the for movement of the piston 31 and the piston 83 is provided by similar means to that described in U.S. Pat. No. 4,226,656.

Figure 2:
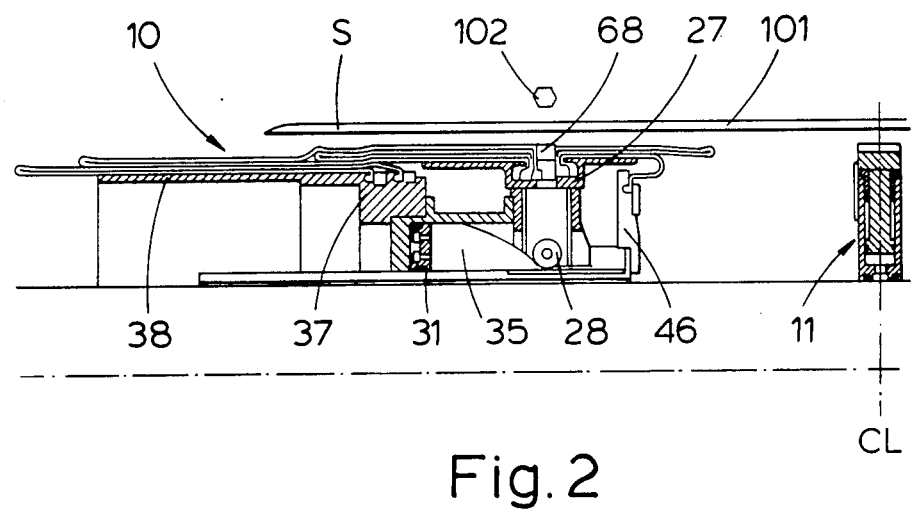

Now with reference to FIG. 2, a cylindrical tire carcass band 101 including sidewalls S together with a pair of bead rings 102 are transferred to the tire building drum 10. The bead rings 102 are radially spaced from the outer surface of the carcass and the carcass band 101 and beads 102 are positioned around the drum 10 in their correct axially spaced positions by a tire carcass transfer device of the type described in U.S. Pat. No. 4,634,489.

Since the drum 10 is symmetrical about the axial center line $C_L$ stages of the tire building process will be described with reference only to one side of the drum, it being understood that the same operation is happening simultaneously on both sides of the center line $C_L$.

Figure 3:
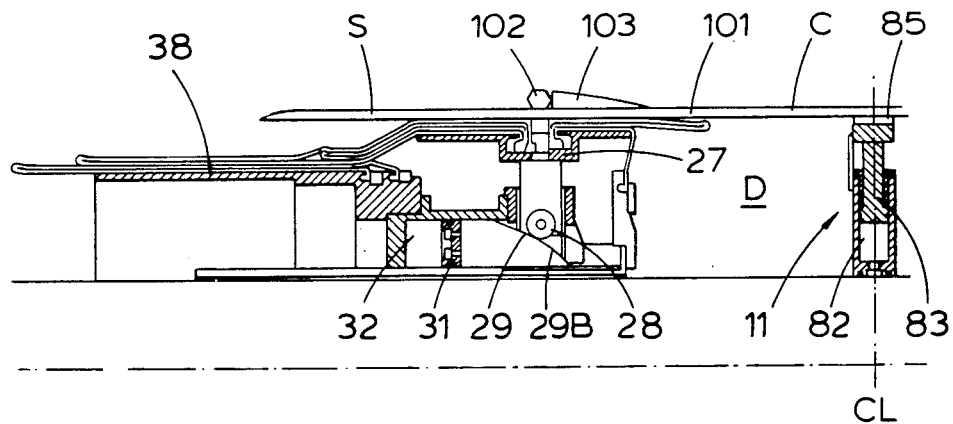

Now with reference to FIG. 3, air pressure is simultaneously applied in the chamber 32 to move the piston 31 axially inwards, and in the bores 82 of the central support drum 11 to expand the drum 11. The pistons 83 are moved radially outwards by air pressure until the elastomeric ring 82 contacts and supports the inner surface of the carcass band 101. Meanwhile, the axially inwards movement of the piston 31 causes the rollers 28 to move up their respective cam surfaces 29 thereby moving the bead clamping segments 27 radially outwards. The bead clamping segments 27 move outwards to clamp the carcass 101 between the bead ring 102 and the elastomeric ring 68. Since the arcuate portions 29B on the cam surfaces engage the roller the radial movement of the bead seat segments 27 is large in comparison with the axial travel of the piston 31. When the bead clamp segments 27 have completed their radially outwards travel to lock against the bead ring 102, the rollers 28 will be onto the inclined portion 29A of the cam surface, and the piston 31 is held in position. An apex strip 103 is placed in position around the drum on the cylindrical carcass band 101 adjacent the bead ring 102. The carcass band 101 now comprises two axially outer sidewall portions 'S' and a central portion 'C' extending between the two bead rings, and forming therebetween a closed cylindrical cavity 'D'.

Figure 4:
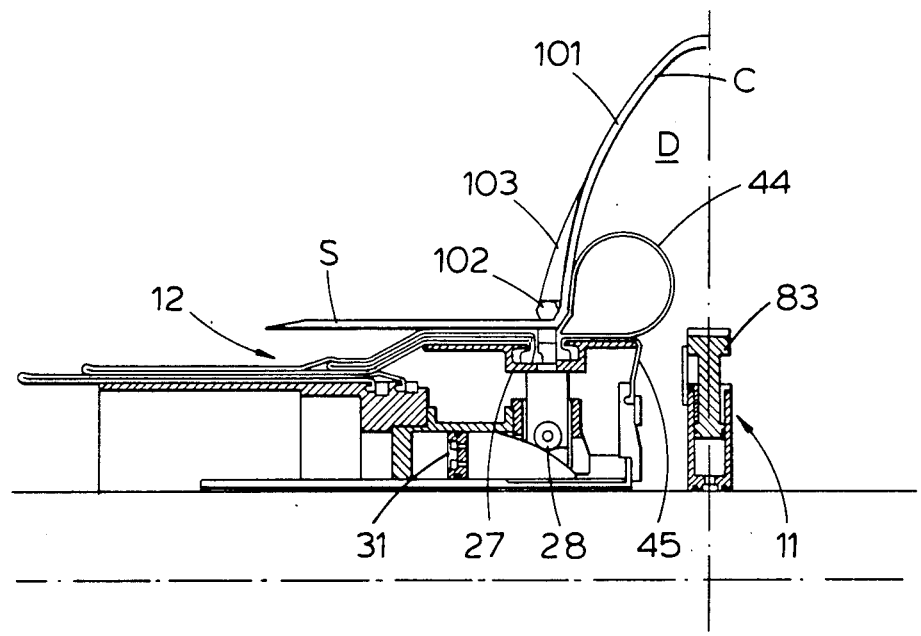

Referring to FIG. 4, air pressure of about 1 bar is introduced into the cylindrical cavity 'D'. As the carcass 101 expands radially outwards under the air pressure the screw 14 is operated to move the end drum assemblies 12 uniformly towards the central support drum 11. The inside shoulder bladder 44 is inflated (to a pressure of about 2.5 bars) to seal against the adjacent inside surface of the carcass band to prevent air pressure leaking from the cavity 'D'. The central portion 'C' of the carcass 101 is shaped outwardly and the end drum assemblies 12 continue movement towards the central drum 11 until the central portion 'C' of the carcass 101 reaches its desired torroidal shape with the bead rings 102 in the desired axial locations. The bead clamping segments 27 and pistons 83 of the central support 11 are maintained in the radially outer position. The sealing bladder 45 prevents air pressure leaking from the cavity 'D' through the bead clamping segments.

Figure 5:
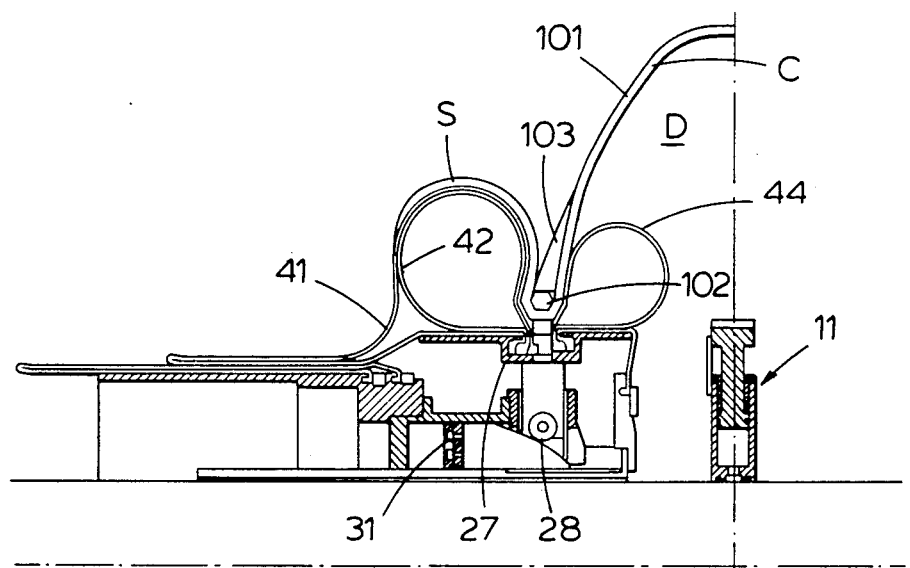

In the next step of the tire building operation illustrated in FIG. 5, the outside shoulder bladder 42 is inflated (at a pressure of about 2 bars) to lift the sidewall portions 'S', of the carcass and wrap its lower portion around the bead ring 102 and the lower portion of the apex strip 103 (lower is used in relation to distance from the rotational axis of the tire) so as to adhere the lower sidewall portions to the inflated torroidal central portion 'C' of the carcass.

Figure 6:
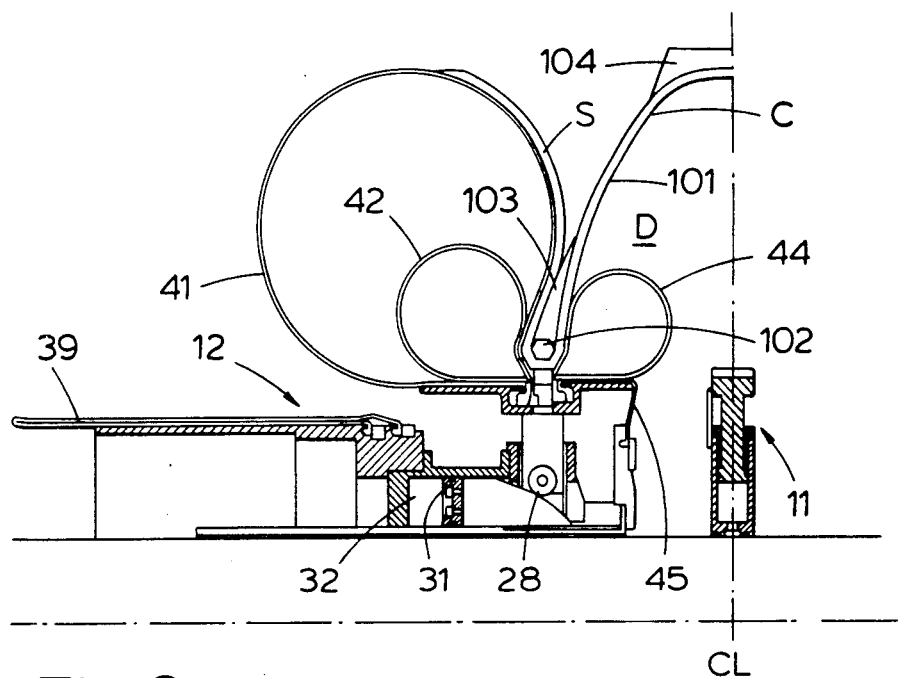

With reference to FIG. 6, a tread and breaker assembly 104 is added to the crown of the torroidal central section 'C' of the carcass 101, and concurrently the top turnover bladder 41 is inflated (at a pressure of about 1 bar) to gradually push the sidewall portion 'S' against the inflated central portion 'C' working outwardly from the bead 102.

Figure 7:
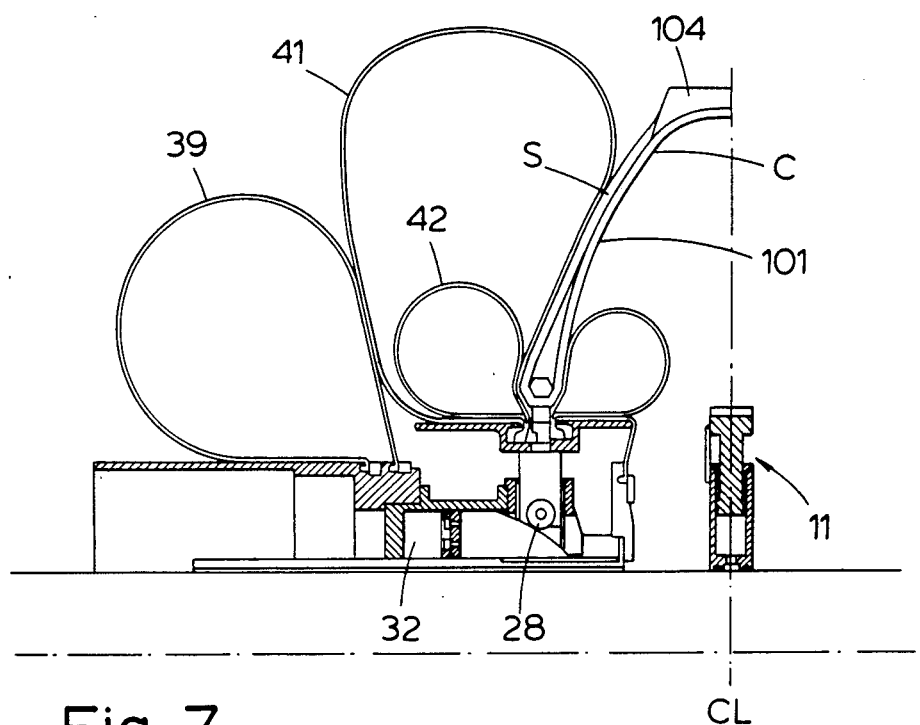
Figure 8:
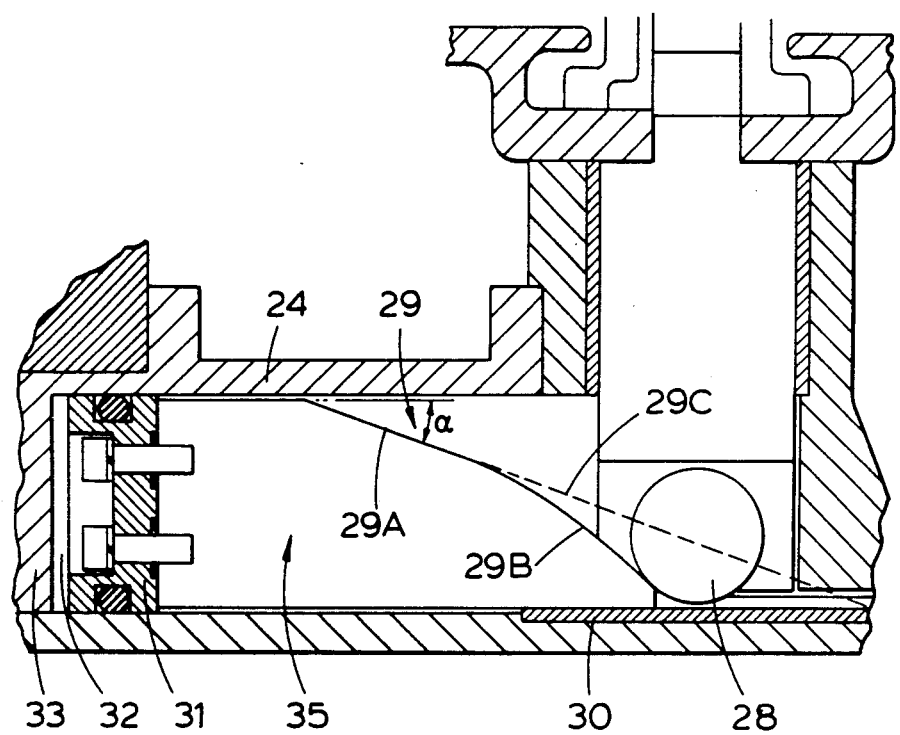

Finally in FIG. 7, the bottom turn-up bladder 39 is inflated (at about 3 bars) to push against the top-turn up bladder 41, which in turn pushes the sidewall portions 'S' against the entire length of the torroidal central portion 'C' of the carcass from bead 102 to tread 104 so that the sidewall portion 'S' overlaps the tread 104.

The four bladders 39, 41, 42, and 44, are deflated and the air pressure is released from within the cavity 'D'. The bead clamping segments 27 are moved radially inwards by moving the piston 31 axially outwardly, and the central support drum 11 is allowed to radially contract to its original size. The assembled torroidal tire carcass can now be removed from the tire building drum 10, and the operating screw 14 returns the end drum assemblies 13 to their starting position ready for the next cycle.

Whilst the invention has been illustrated with reference to present embodiment thereof, it will be apparent to those skilled in the art that various changes and modifications can be made therein without departing from the scope and spirit of the invention, for example various different timing sequences for the inflation and contraction of the bladders 39, 41, 42, and 44 can be used, together with other sequences for the radial expansion and contraction of the bead seat segments 27 and the central support drum 11.

I claim:

1. A tire building drum having a center shaft, and a pair of end drum assemblies mounted axially slidable on the center shaft, each of said end drum assemblies comprises:

a sleeve mounted co-axially on the center shaft and slideable along the shaft,
   an annular housing mounted on the sleeve and forming a co-axial annular chamber around the sleeve,
   an annular expansion means mounted co-axially on the annular housing for radial movement relative to the sleeve,
   an annular piston axially slideable in the co-axial annular chamber to effect a radially outward force and movement of the annular expansion means,
   ramp means associated with the annular piston and engageable with the annular expansion means to move the annular expansion means radially of the sleeve in response to axial movement of the piston, said ramp means including a cam surface comprising two portions, an inclined radially outer portion, and a convex radially inner portion.

2. A building drum as claimed in claim 1 wherein the slope of the inclined radially outer portion with respect to the drum axis is approximately 20° (twenty degrees).

3. A building drum as claimed in claim 2 wherein the radius of the convex arcuate inner portion is such that the total axial length of cam surface is reduced by between 30%–40% (thirty to forty percent) of its imaginary length had the inclined surface been continued.

4. A building drum as claimed in any one of claims 1 to 3 wherein the annular expansion means is a bead seat means comprising a plurality of bead seat segments having a bead seat thereon, and the ramp means comprises a plurality of axial projections affixed to the annular piston each of which has a cam surface thereon engageable with a bead seat segment for radial movement thereof.

5. A building drum as claimed in claim 4 and including a plurality of annular inflatable bladders on each end drum assembly and which when uninflated form a cylindrical tire building surface, said bladders including an inside shoulder bladder having a solid annular lip portion and which is located axially inwardly of the bead seat and outside shoulder bladder having a solid annular lip portion and which is located axially outwardly of the bead seat and a turn-up bladder having at least one annular lip portion and which is located axially outwardly of the bead seat and completely envelopes the outside shoulder bladder, and in which the bead seat segments of each end drum assembly are each provided with an undercut circumferentially extending slot and all the slots are axially aligned to form a circumferential groove, wherein the annular lip portions of said bladders are located in the groove, the lip portions of the outside shoulder bladder and the turn-up bladder being located on one axial side of the groove, and the lip portion of the inside shoulder bladder being located on the other axial side of the groove and a retaining ring comprising a plurality of arcuate segments is fitted between the two axial sides of the groove to compress the lip portions against their respective sides of the groove.

6. A building drum as claimed in claim 5 and in which the axially outer end of the annular housing has a co-axial annular cylindrical support mounted thereon, in which a second turn-up bladder is located axially outside the first turn-up bladder and has at least one solid annular lip portion for attachment to the annular cylindrical support wherein there is a radially undercut circumferential groove in the annular cylindrical support in which the lip portion can be located, and a split retaining ring that is radially removeable and which holds the lip portion in the groove.

7. A building drum as claimed in claim 6 wherein an annular sealing bladder is located axially inwardly of the bead seat and extends between the bead segments and the sleeve.

8. A building drum as claimed in claim 7 wherein the sealing bladder has a pair of solid annular lip portions one of which is attached to a radial flange extending outwardly from the axially inner end portion of the sleeve, and the other of which is located in the circumferential groove formed in the bead segments.

9. A tire building drum having a center shaft; a pair of co-axial end drum assemblies each mounted axially slidable on the center shaft for axial movement towards and away from each other, the end drum assemblies each providing a generally cylindrical surface for supporting a cylindrical tire carcass band, and including a radially expandable bead seating means; and annular inflatable bladders which when uninflated form substantially cylindrical tire building surfaces around the end drum assemblies, said inflation bladders comprising an inside shoulder bladder adjacent to and extending axially inwards of the bead seating means, an outside shoulder bladder adjacent to and extending axially outwards of the bead seating means, a first turn-up bladder also located adjacent the axially outer side of the bead seating means and completely enveloping the outside shoulder bladder, and a second turn-up bladder located axially outside the first turn-up bladder, and when said bladders are uninflated lying radially inwardly of the first turn-up bladder.

10. A drum as claimed in claim 9 wherein the bladders each have at least one solid annular lip portion for attachment to the respective end drum assembly, and wherein, the annular lip is located in a radially undercut circumferential groove in the end drum assembly and is secured in position by a segmented retaining ring which can be withdrawn radially outwardly.

11. A drum as claimed in claim 9 wherein for at least one bladder, the respective segmented ring is secured to the end drum assembly by suitable fastening means.

12. A drum as claimed in claim 10, or claim 11, wherein the bead seating segments of the end drum assembly has an inverted 'T' shaped groove therein, and the lip portions of at least two bladders are located in said groove on axially opposite sides thereof, and are held in position by a segmented ring axially located between the two lip portions and exerting a compression load thereon.

* * * * *